(12) United States Patent
Bringley et al.

(10) Patent No.: US 7,312,252 B2
(45) Date of Patent: *Dec. 25, 2007

(54) NANOPARTICULATE ANIONIC CLAYS

(75) Inventors: Joseph F. Bringley, Rochester, NY (US); Craig A. Morris, Farmington, NY (US)

(73) Assignee: Eastman Kodak Company, Rochester, NY (US)

( * ) Notice: Subject to any disclaimer, the term of this patent is extended or adjusted under 35 U.S.C. 154(b) by 407 days.

This patent is subject to a terminal disclaimer.

(21) Appl. No.: 10/850,489

(22) Filed: May 20, 2004

(65) Prior Publication Data

US 2005/0261381 A1    Nov. 24, 2005

(51) Int. Cl.
*B01F 3/12* (2006.01)
*B01J 13/00* (2006.01)

(52) U.S. Cl. .............................. 516/88; 516/9; 516/77; 516/78; 516/927; 977/773; 977/786; 977/810; 977/900

(58) Field of Classification Search .................. 516/78, 516/79, 88
See application file for complete search history.

(56) References Cited

U.S. PATENT DOCUMENTS

| | | | |
|---|---|---|---|
| 6,329,515 B1 | 12/2001 | Choy et al. | |
| 2002/0111263 A1 | 8/2002 | Stamires et al. | |
| 2003/0129243 A1 | 7/2003 | Pitard | |
| 2004/0052849 A1 | 3/2004 | O'hare | |
| 2005/0244439 A1 | 11/2005 | Bringley | |
| 2005/0260271 A1 | 11/2005 | Bringley | |
| 2006/0124783 A1* | 6/2006 | O'Connor et al. ............. | 241/1 |

FOREIGN PATENT DOCUMENTS

| | | |
|---|---|---|
| EP | 0 987 328 | 3/2000 |
| WO | WO 02/47729 | 6/2002 |
| WO | WO 03/011233 | 2/2003 |
| WO | WO 2004/050251 * | 6/2004 |

OTHER PUBLICATIONS

Jin-Ho Choy, Seo-Young Kwak, Jong-Sang Park and Yong-Joo Jeong; "Cellular Uptake Behavior Of [γ-$^{32}$P] Labeled ATP-LDH Nanohybrids"; J. Mater. Chem.; 2001; 11; pp. 1671-1674.

Aamir I. Khan, Lixu Lei, Alexander J. Norquist and Dermot O'Hare; "Intercalation And Controlled Release Of Pharmaceutically Active Compounds From A Layered Double Hydroxide"; Chem. Commun.; 2001; pp. 2342-2343.

Jin-Ho Choy, Seo-Young Kwak, Jong-Sang Park, Yong-Joo Jeong and Josik Portier; "Intercalative Nanohybrids Of Nucleoside Monophosphates And DNA In Layered Metal Hydroxide"; J. Am. Chem. Soc.; 1999; 121; pp. 1399-1400.

Jin-Ho Choy, Seo-Young Kwak, Yong-Joo Jeong and Jong-Sang Park; "Inorganic Layered Double Hydroxides As Nonviral Vectors"; Angew. Chem. Int. Ed.; 2000; 39; No. 22; pp. 4042-4045.

Joseph F. Bringley and Nancy B. Liebert; "Controlled Chemical And Drug Delivery Via The Internal And External Surfaces Of Layered Compounds"; Journal Of Dispersion Science And Technology; 2003; vol. 24; Nos. 3 & 4; pp. 589-605.

Walter T. Reichle; Synthesis Of Anionic Clay Minerals (Mixed Metal Hydroxides, Hydrotalcite); Solid State Ionics; 22; pp. 135-141; 1986.

S. Amin, G. G. Jayson; "Humic Substance Uptake By Hydrotalcites And Pilcs"; Water Research; vol. 30; No. 2; Feb. 1996; pp. 299-306.

* cited by examiner

*Primary Examiner*—Randy Gulakowski
*Assistant Examiner*—Timothy J. Kugel
(74) *Attorney, Agent, or Firm*—Andrew J. Anderson

(57) ABSTRACT

A composition of matter comprising anionic clay having the general formula $$[M^{2+}_{1-x}M^{3+}_{x}(OH)_2]^{x+}(x/n)A^{n-}\cdot yH_2O \quad \text{(I)}$$

or $$[M^{1+}M^{3+}_{2}(OH)_6]^{1+}(1/n)A^{n-}\cdot yH_2O; \quad \text{(II)}$$

where $M^{1+}$ is a mono-valent metal; $M^{2+}$ is a divalent metal; and $M^{3+}$ is a trivalent metal; A is an inorganic or organic anion, chosen such that the rule of charge neutrality is obeyed; n is an integer; x is any rational number between 0 and 1; and y is any rational number between 0 and 10; where the anionic clay is in the form of particles having a volume weighted mean particle size diameter of less than 500 nm. Stable colloidal dispersions comprise such anionic clay particles having a volume weighted mean particle size diameter of less than 500 nm dispersed in a liquid medium. Method for preparing such stable colloidal dispersion of anionic clay particles comprises simultaneously bringing together salt solutions of $M^{2+}$ and $M^{3+}$ metals, or of $M^{1+}$ and $M^{3+}$ metals, and a base in a high shear mixing zone within a liquid dispersion medium in a particle precipitation vessel, and precipitating anionic clay particles having a volume weighted mean particle size diameter of less than 500 nm.

27 Claims, 1 Drawing Sheet

NANOPARTICULATE ANIONIC CLAYS

FIELD OF THE INVENTION

The present invention relates to nanoparticulate size anionic clay compositions, stable colloidal dispersions of nanoparticulate size anionic clay particles, and methods of preparing stable colloidal dispersions of nanoparticulate size anionic clay particles.

BACKGROUND OF THE INVENTION

Nanoparticulate materials have received much attention recently as a result of their unique physical properties and applications in a variety of devices and products. Nanoparticulate silica and alumina colloids have been known for many years and have many uses in industrial, medical and consumer products. Much effort has been given to the development of novel nanoparticulates, and to the study of their physical properties. A nanoparticle has dimensions on the order of a molecular scale, typically between about 1-100 nm, or $10^{-9}$ to $10^{-7}$ meters.

Layered compounds are a unique class of materials that have strong chemical bonding in two-dimensions but only weak interactions in the third-dimension. As a result, layered compounds often display unique chemical and physical properties such as the ability to adsorb or intercalate ions, compounds and organic molecules. Laboratory experiments have demonstrated the use of layered compounds in the controlled release of functional chemistry, in the transport of biological materials, and in drug-delivery. Layered compounds are employed commercially in the design of novel composites, as additives in health and beauty products, as barrier layers in polymeric systems, as ion-exchange materials, rheological modifiers, to name only a few applications. Clays are an important class of layered compounds which find many commercial applications. Examples of clays include the minerals bentonite, montmorillonite, hectorite and the synthetic clay, laponite. These are alumino-silicate based materials whose structure consists of stacks of alumino-silicate sheets separated by cations, such as $Na^+$, $K^+$ and $Ca^{2+}$. The cations may be exchanged for other cations, such as metal-ions, or by cationic organic molecules such as quaternary ammonium compounds, (e.g., $CH_3(CH_2)_nN^+R_3$). Clays of this nature are therefore often referred to as "cationic clays". Cationic clays are commercially available as nanoparticulates under the tradename Laponite, and find many applications in various articles.

Layered double hydroxides, closely related to the mineral "hydrotalcite", are a unique class of layered compounds. These materials share layered structural characteristics with their cousin "cationic clays", but rather than cations, layered double hydroxides contain anions between their metal hydroxide sheets. For this reason they are often referred to as "anionic clays". The interlayer anions contained within layered double hydroxides may be exchanged for other anions (eg., $Cl^-$, $Br^-$, $I^-$, $NO_3^-$, $CO_3^{2-}$, $SO_3^-$) and by anionic organic compounds and especially organic compounds containing anionic funtional groups (carboxylates, sulfonates, and phosphates). Thus, layered double hydroxides are uniquely suited to develop complex inorganic-organic hybrids with anionically charged organic molecules. Anionically charged organic molecules and supra-molecules (e.g., DNA) are particularly prevalent in biological systems and thus layered double hydroxides are well suitable for forming hybrids with bio-molecules.

The synthesis of layered double hydroxides has been reviewed by a number of authors, and several synthetic approaches have been disclosed. See, e.g., W. T. Reichle, "Synthesis of anionic clay minerals (mixed metal hydroxides, hydrotalcite) Solid State Ionics, 22, 135-141 (1986); F. Cavani, F. Trifiro and A. Vaccari, "Hydrotalcite-type anionic clays: preparation, properties and applications", Catalysis Today, 11, 173-301 (1991); F. Trifiro and A. Vaccari, "Hydrotalcite-like anionic clays (Layered double hydroxides), in *Comprehensive Supramolecular Chemistry*, "Solid State Supramolecular Chemistry: Two- and Three-dimensional Inorganic Networks", Alberti G.; Bein, T. Eds., Elsevier, N.Y., Chapter 8 (1996). By far the most commonly used method involves the coprecipitation of an aqueous solution of mixed-metal salts through the addition of a base. In the coprecipitation method, the precipitation has been described as being accomplished by (a) slow (dropwise) addition of a mixed-metal solution to a basic solution; (b) addition of a basic solution to a vigorously stirred solution of the mixed-metal salts, or (c) slow (dropwise) addition of a mixed-metal solution to a basic solution at a constant pH. Other methods of producing layered double hydroxides involve hydrothermal synthesis, and the so-called "reconstruction method". The hydrothermal methods are not commonly used since they are generally more difficult to carry out and produce products having a large particle size (typically greater than 1-2 microns). The reconstruction method is useful for carrying out ion-exchange reactions of hydrotalcite, but is not used to prepare pristine layered double hydroxides.

U.S. Pat. No. 6,329,515 B1 to Choy et al. describes bio-inorganic hybrid composites which are able to retain and carry bio-materials with reversible dissociativity. The composites comprise layered double hydroxides having intercalated therein a bio-material. The invention also describes methods of preparation of the composites which comprises coprecipitating, with an alkaline material, an aqueous solution comprising an bivalent metal (M(II)) and trivalent metal (M(III)) at a specified molar ratio. The particles size and colloidal stability of the resulting product, however, are not reported.

Layered double hydroxide "bio-nanohybrids" are discussed by Choy et al. in J. Mater. Chem. 11, 1671(2001). However, the particles size and colloidal stability of the resulting product are not determined, and no evidence is provided for composites having nanoscale dimensions. The term "nanohybrid" is apparently used to describe the interlayer dimensions of the intercalated biocomposites (i.e, the distance separating two adjacent layers) and not the particle dimensions of the pristine layered double hydroxide, or the resulting intercalated layered double hydroxide.

WO 03/011233 A1 to Choy et al. describes hybrid materials comprised of an active component for raw materials for cosmetics and a layered metal hydroxide. The application describes materials and methods for preparing hydrozincytes ($Zn_5(OH)_82$ anion), and electron micrographs contained therein show some particles apparently having nano-sized dimensions. The particle size distributions of the materials, however, are not reported. The application also describes methods for surface modification of the particles to obtain dispersions with improved colloidally stability. Layered double hydroxides having nano-sized dimensions, and colloidally stable layered double hydroxide dispersions, however, are not demonstrated. The surface modification methods employed further are difficult and expensive to perform, and may disrupt the ability of the layered materials to act as chemical delivery agents.

There remains a need for anionic clays having nanoparticulate dimensions and for stable colloidal dispersions of anionic clays. There remains a need for colloidally stable, nanoparticle dispersions of anionic clays having a high percent solids. There remains a need for colloidally stable, nanoparticle dispersions of anionic clays which do not contain surface modification reagents such as polymers, surfactants, silicates or organo-silanes. There is a need for methods of preparing colloidally stable, nanoparticle dispersions of anionic clays which are efficient and provide the product at an industrial scale and at a low-cost.

SUMMARY OF THE INVENTION

In accordance with one embodiment, the invention is directed towards a composition of matter comprising anionic clay having the general formula $$[M^{2+}_{1-x}M^{3+}_{x}(OH)_2]^{x+}(x/n)A^{n-}\cdot yH_2O \qquad (I)$$

or $$[M^{1+}M^{3+}_{2}(OH)_6]^{1+}(1/n)A^{n-}\cdot yH_2O; \qquad (II)$$

where $M^{1+}$ is a mono-valent metal; $M^{2+}$ is a divalent metal; and $M^{3+}$ is a trivalent metal; A is an inorganic or organic anion, chosen such that the rule of charge neutrality is obeyed; n is an integer; x is any rational number between 0 and 1; and y is any rational number between 0 and 10; where the anionic clay is in the form of particles having a volume weighted mean particle size diameter of less than 500 nm. In accordance with further embodiments, the invention is also directed towards stable colloidal dispersions comprising such anionic clay particles having a volume weighted mean particle size diameter of less than 500 nm dispersed in a liquid medium, and towards a method for preparing such stable colloidal dispersion of anionic clay particles comprising simultaneously bringing together salt solutions of $M^{2+}$ and $M^{3+}$ metals, or of $M^{1+}$ and $M^{3+}$ metals, and a base in a high shear mixing zone within a liquid dispersion medium in a particle precipitation vessel, and precipitating anionic clay particles having a volume weighted mean particle size diameter of less than 500 nm.

DETAILED DESCRIPTION OF THE INVENTION

Figure 1:
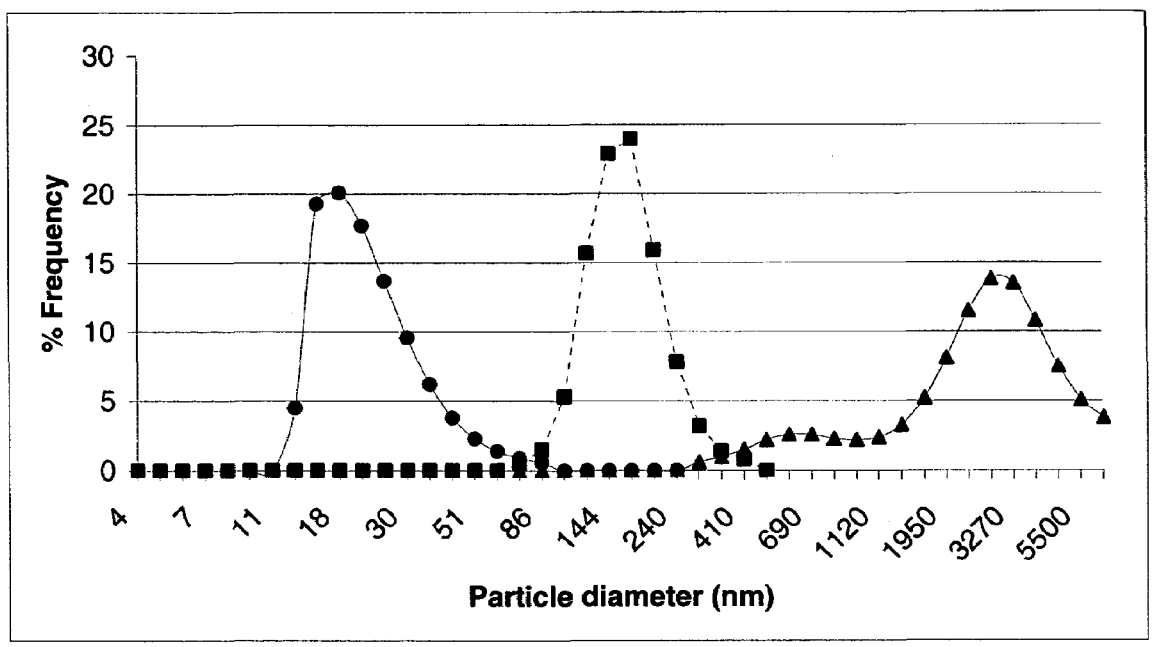
FIG. 1 is a graph illustrating the particle size distribution for Example 1 (squares), Example 2 (circles) and Comparison Example 4 (triangles).

The invention provides nanoparticulate anionic clays, and colloidal dispersions of nanoparticulate anionic clays, of particle sizes which are heretofore unavailable. The nanoparticulate anionic clays may be used in a variety of applications, such as composites, as additives in health and beauty products, as barrier layers in polymeric systems, as ion-exchange materials, rheological modifiers, drug-delivery agents, bio-molecule carriers and as controlled chemical-delivery agents. The nanoparticulate anionic clays may be dispersed in a solvent to form a colloid, to facilitate its use in the above application(s). In various embodiments, the invention also provides colloidally stable, nanoparticle dispersions of anionic clays having a high percent solids. The invention also provides a method of preparing nanoparticulate anionic clays, and colloidally stable, nanoparticle dispersions of anionic clays.

Anionic clays prepared in accordance with the invention comprise layered double hydroxides. Layered double hydroxides are closely related to the mineral hydrotalcite, and have the general formulas:

$$[M^{2+}_{1-x}M^{3+}_{x}(OH)_2]^{x+}(x/n)A^{n-}\cdot yH_2O \qquad (I)$$

or $$[M^{1+}M^{3+}_{2}(OH)_6]^{1+}(1/n)A^{n-}\cdot yH_2O; \qquad (II)$$

where $M^{1+}$ is a mono-valent metal which may be selected from, e.g., but not limited to Li, Na, K, Rb, Cs; $M^{2+}$ is a divalent metal which may be selected from, e.g., but not limited to Ca, Mg, Mn, Co, Ni, Cu, Zn, Cd; and $M^{3+}$ is a trivalent metal which may be selected from, e.g., but not limited to Cr, Fe, Al, Ga, In, Mo; A is an inorganic or organic anion, including but limited to $OH^-$, $NO_3^-$, $F^-$, $Cl^-$, $Br^-$, $I^-$, $ClO_4^-$, $SO_4^{2-}$, $CO_3^{2-}$, chosen such that the rule of charge neutrality is obeyed; n is an integer; x may be any rational number between 0 and 1 (typically between 0.01 an 0.5, more typically between 0.01 and 0.4); and y may be any rational number between 0 and 10. Anionic clays of the type described by formula (I) include $Mg_2Al(OH)_6\cdot 1/2CO_3\cdot yH_2O$ (note that this is equivalent to $[Mg_{1-x}Al_x(OH)_2]$ 0.165 $CO_3\cdot yH_2O$ for x=0.33); $Zn_2Al(OH)_6\cdot 1/2CO_3\cdot yH_2O$; $Mg_2Al(OH)_6\cdot NO_3\cdot yH_2O$; $Mg_2Al(OH)_6\cdot Cl\cdot yH_2O$; and $Zn_2Al(OH)_6\cdot NO_3\cdot yH_2O$. Anionic clays of the type described by formula (II) include $LiAl_2(OH)_6\cdot Cl\cdot yH_2O$ and $NaAl_2(OH)_6\cdot Cl\cdot yH_2O$.

The invention provides a composition of matter comprising an anionic clay having the general formula (I) or (II) where the anionic clay is in the form of particles having a volume weighted mean particle size diameter of less than 500 nm. For the purpose of the invention, as particles will be of irregular sizes, a particle size diameter is the diameter of a sphere having the equivalent volume as the particle. It is preferred that the mean, volume weighted, particle size diameter of the particles is less than 200 nm, and more preferably less than 100 nm. It is further preferred that at least 90 volume percent of the particles of the anionic clay composition have a diameter smaller than 500 nm, more preferably smaller than 200 nm, and most preferably smaller than 100 nm. This is preferred because nanoparticles of these dimensions can more readily be applied in formulations such as nanocomposites, and chemical and drug-delivery agents. It is preferred that the anion is selected from $OH^-$, $NO_3^-$, $F^-$, $Cl^-$, $Br^-$, $I^-$, $ClO_4^-$, $SO_4^{2-}$, $CO_3^{2-}$, and more preferably $NO_3^-$ or $Cl^-$. Nitrate and chloride ion are preferred because they are readily available and are excellent leaving groups which allow for the intercalation of the anionic clay by other anions, especially functional-active organic anions such as pharmaceuticals, cosmetics, drugs, bio-materials, etc. It is preferred that $M^{2+}$ is selected from Ca, Mg and Zn. It is preferred that $M^{3+}$ is selected from Al. These are preferred because they form very common anionic clays which are approved for human-contact, food-contact materials or as food additives. Nanoparticulate anionic clay compositions in accordance with the invention are particularly suitable for use in preparation of compositions for a chemical-delivery, and/or, a drug-delivery system as described in commonly assigned, concurrently filed, copending U.S. Ser. No. 10/850,492, and corresponding U.S. Patent Publication 2005/0260271, the disclosure of which is incorporated by reference herein, as the small average size of such particulates enables efficient intercalation of a relatively high percentage of functional-active compound, at relatively low ratios of anionic clay to functional-active compound.

The invention also provides a colloidal dispersion comprising an anionic clay of the above general formulas and particle sizes. A colloid is a suspension of particles in a liquid medium, the particles being so small that gravitational forces do not aggregate or settle the particles from suspension, but rather the particles are kept in suspension due to particle charging and simple Brownian motion. Colloidal particles find use in a broad variety applications such as pigments for paints, as thickeners and coating aids, in cosmetic products, in paper products, as polishing media in semiconductor electronics, to name only a few. The use and application of a colloid may depend upon the particle size and distribution. It is preferred that colloids contain as few particles as possible which have a diameter greater than about 1 micron, since these may settle, or may cause a coarseness in the applied product. Colloids as such are often referred to as stable colloids. A stable colloid as referenced in the examples is defined as a particulate suspension in which there is no evidence for aggregation of particles as determined by particle size measurement, and that there is not visible flocculation or settling of the colloid for at least one week after its preparation. Particle growth due to aggregation of the primary particles to average particle size diameters greater than about three times the original diameter, and visible settling of the colloid within one week of its preparation is indicative of an unstable colloid.

It is preferred that the anionic colloid comprises an aqueous dispersion. It is preferred that the anionic clay colloid does not necessarily contain a surfactant or a surface modification or surface treatment addenda in order to remain stable. Surfactants or surface modification agents may bind to the interior and exterior surfaces of the clay particles and may disrupt the ability of the layered materials to act as chemical delivery agents. However, in cases where the anionic clay is being used as a composite in polymer formulations, or as a rheological modifier, it may be desirable to add a surfactant, a dispersion aid or a surface modification agent. It is preferred that the colloid has a high concentration of solids, preferably greater than 5 weight % and more preferably greater than weight 10%. It is preferred that the colloid has a salt concentration of less than 0.1 mole/liter. High salt concentrations are common in the synthesis of layered double hydroxides since salt is a byproduct of the reaction. Low salt concentrations are preferred because the tendency of the colloid to aggregate or agglomerate will increase as the salt concentration increases. It is preferred that the colloid is substantially washed free of salt by methods such as diafiltration, ultrafiltration or nanofiltration.

The particle size(s) of nanoparticulate anionic clays in accordance with the invention may be characterized by a number of methods, or combination of methods, including coulter methods, light-scattering methods, sedimentation methods, optical microscopy and electron microscopy. The particle size is, in fact, a complex parameter and is best described by a series of parameters including the mean particle size diameter, the standard deviation of the distribution and the distribution width. This is because not all particles are the same size and shape, and the variability in particle size may be small (monodisperse) or very large (polydisperse). Sedimentation is a simple method of discerning the presence of large particles, since particles greater than about 1 micron will settle to the bottom of the container holding a suspension over time. This technique is often used to determine the stability of a colloid, colloids that do not visibly settle within about a week are considered stable colloids. Often, stable colloids do not visibly settle over months or even years. Sedimentation, however, may give little or no information regarding the particle size distribution of particles less than about 1 micron. Optical microscopy (visible light microscope) may also be used to obtain information regarding particles larger than about 1-2 microns. Electron microscopy may be used to "visualize" particles having dimensions smaller than 1 micron and even smaller than 100 nm (0.1 microns). However, electron microscopy samples only a very limited number of particles, typically less than 100 particles in a single image. Colloids, however, especially colloids having nanosized dimensions may contain $10^{12}$ to $10^{15}$ particles per milliliter, and therefore electron microscopy may give little or no information regarding the mean particle size distribution, the standard deviation of the distribution and the distribution width. Electron microscopy may further be misleading in that it can be used to selectively image particles having only a certain size and shape. Light-scattering techniques, on the other hand, may sample $10^9$ or more particles and thus are capable of giving excellent colloidal particle statistics. Light-scattering techniques may be used to give the percentage of particles existing within a given interval of diameter or size, for example, 90% of the particles are below a given value. Light-scattering techniques are thus preferably used to obtain information regarding mean particle size diameter, the mean number distribution of particles, the mean volume distribution of particles, standard deviation of the distribution(s) and the distribution width for nanoparticulate anionic clay particles in accordance with the invention. For colloids, it is preferred that at least 90% of the particles are less than 4-times the mean particle size diameter, and more preferably that at least 90% of the particles are less than 3-times the mean particle size diameter. The mean particle size diameter may be determined as the number weighted (mean size of the total number of particles) or as the area, volume or mass weighted mean. It is preferred that the volume or mass weighted mean particle size diameter is determined, since larger particles having a much greater mass are more prominently counted using this technique.

Nanoparticulate anionic clay particle compositions and colloidal dispersions in accordance with the invention may be prepared by a process comprising simultaneously bringing together salt solutions of $M^{2+}$ and $M^{3+}$ metals, or of $M^{1+}$ and $M^{3+}$ metals, and a base in a high shear mixing zone within a dispersion medium in a particle precipitation vessel. High shear mixing may be accomplished by the velocity of the flow of solutions at the introduction point, or through the impingement of feeds on to one-another or on to a surface, or through provision of additional energy through devices such as a rotary mixer, a static mixer, in-line mixers, dispersators, through ultrasonic vibration, or other high shear mixing apparatus. The mixing efficiency of the apparatus is dependent upon the type of mixing method chosen and the precise geometry and design of the mixer. For propeller-like mixers the mixing efficiency may be approximated by the turnover rate, where the turnover rate is the stir rate (rev/sec.) times the turnover volume (ml/rev) divided by the aqueous volume. For in-line or static mixers, the mixing efficiency may be approximated by multiplying the sum of the addition rates of the colloidal dispersions by the turnover volume of the mixer. In each case, the mixing efficiency has units of turnovers/sec. It is preferred that the mixing efficiency be greater than about 0.10 turnovers/sec, and preferably greater than 0.5 turnovers/sec and most preferably greater than 1 turnover/sec. Complete mixing of the three solution streams is preferably accomplished in less than about 10 seconds; and is more preferably accomplished substantially instantaneously. It is desirable that the entire content of the particle precipitation vessel be maintained as close to a uniform concentration of particles as possible during particle precipitation, as inadequate mixing process may lead to an inferior control of resulting particle size characteristics. The spatial zone of concentration non-uniformity near the feed introduction points should accordingly be minimized. Thus, feed introduction into a region of high agitation, and the maintenance of a generally well-mixed bulk region is preferred.

In accordance with a preferred embodiment of the invention, the metal salt solutions and base solution are contacted in a particle precipitation vessel by introducing feed streams of such components into a highly agitated zone of the particle precipitation vessel created by action of a rotary agitator, and wherein the feed streams and resulting precipitated anionic clay particles are dispersed in the vessel by action of the rotary agitator. Effective micro and meso mixing, and resulting intimate contact of the feed stream components, enabled by the introduction of the feed streams into the vessel within a distance of one impeller diameter from the surface of the impeller of the rotary agitator, enable precipitations of anionic clay particles with a volume-weighted average diameter of less than 500 nanometers, preferably less than 200 nanometers, and most preferably less than 100 nanometers. In addition, a narrow size-frequency distribution for the particles may be obtained. A measure of the volume-weighted size-frequency distribution is given by the standard deviation (sigma) of the measured particle sizes. The coefficient of variation ("COV", defined as the standard deviation (sigma) of particle diameter divided by the mean grain diameter, times 100), e.g., is typically 50% or less, with COVs of less than 30% being enabled. The size-frequency distribution may therefore be relatively monodisperse. Process conditions may be controlled in the particle precipitation vessel, and changed when desired, to vary particle size as desired. Preferred mixing apparatus which may be used in accordance with such embodiment includes rotary agitators of the type which have been previously disclosed for use in the photographic silver halide emulsion art for precipitating silver halide particles by reaction of simultaneously introduced silver and halide salt solution feed streams. Such rotary agitators may include, e.g., turbines, marine propellers, discs, and other mixing impellers known in the art (see, e.g., U.S. Pat. Nos. 3,415,650; 6,513,965, 6,422,736; 5,690,428, 5,334,359, 4,289,733; 5,096,690; 4,666,669, EP 1156875, WO-0160511).

While the specific configurations of the rotary agitators which may be employed in preferred embodiments of the invention may vary significantly, they preferably will each employ at least one impeller having a surface and a diameter, which impeller is effective in creating a highly agitated zone in the vicinity of the agitator. The term "highly agitated zone" describes a zone in the close proximity of the agitator within which a significant fraction of the power provided for mixing is dissipated by the material flow. Typically it is contained within a distance of one impeller diameter from a rotary impeller surface. Introduction of the feed streams into a particle precipitation vessel in close proximity to a rotary mixer, such that the feed streams are introduced into a relatively highly agitated zone created by the action of the rotary agitator provides for accomplishing meso-, micro-, and macro-mixing of the feed stream components to practically useful degrees.

Mixing apparatus which may be employed in one particular embodiment of the invention includes mixing devices of the type disclosed in Research Disclosure, Vol. 382, February 1996, Item 38213. In such apparatus, means are provided for introducing feed streams from a remote source by conduits which terminate close to an adjacent inlet zone of the mixing device (less than one impeller diameter from the surface of the mixer impeller). To facilitate mixing of the feed streams, they are introduced in opposing direction in the vicinity of the inlet zone of the mixing device. The mixing device is vertically disposed in a reaction vessel, and attached to the end of a shaft driven at high speed by a suitable means, such as a motor. The lower end of the rotating mixing device is spaced up from the bottom of the reaction vessel, but beneath the surface of the fluid contained within the vessel. Baffles, sufficient in number of inhibit horizontal rotation of the contents of the vessel, may be located around the mixing device. Such mixing devices are also schematically depicted in U.S. Pat. Nos. 5,549,879 and 6,048,683, the disclosures of which are incorporated by reference. Mixing apparatus which may be employed in another embodiment of the invention includes mixers which facilitate separate control of feed stream dispersion (micromixing and mesomixing) and bulk circulation in the precipitation reactor (macromixing), such as descried in U.S. Pat. No. 6,422,736, the disclosure of which is incorporated by reference.

EXAMPLES

Measurement of Particle Size

The volume-weighted, mean particle size diameters of anionic clay dispersions obtained in the following examples were measured by a dynamic light scattering method using a MICROTRAC® Ultrafine Particle Analyzer (UPA) Model 150 from Leeds & Northrop. The analysis provides percentile data that show the percentage of the volume of the particles that is smaller than the indicated size. The 50 percentile is known as the median diameter, which is referred herein as median particle size. The volume-weighted mean particle size diameter is calculated from the area distribution of the particle size as described in the MICROTRAC® Ultrafine Particle Analyzer (UPA) Model 150 manual. The standard deviation describes the width of the particle size distribution. The smaller the standard deviation the narrower the width of the distribution.

Examples 1-3

Preparation of Nanoparticulate Anionic Clays, Materials and Methods $MgCl_2:6H_2O$ and $AlCl_3:6H_2O$ and NaOH were purchased from Aldrich Chemical Company. Solutions were prepared using pure distilled water. A highly efficient prop-like mixing apparatus of the type described in Research Disclosure, Vol. 382, February 1996, Item 38213, was employed to prepare nanoparticulate colloids. Solutions were introduced into a zone of high shear mixing via calibrated peristaltic pumps at known flow rates. The mixing efficiencies and flow rates were varied to obtain stable nanoparticle colloidal dispersions. The mixing efficiency of the apparatus is described by the turnover rate, where the turnover rate=(stir rate(rev/min)×turnover volume (ml/rev)) divided by the aqueous volume. The mixing efficiency typically was kept constant for each example and was about 25 turnovers/min, or 0.4 turnovers/sec.

Example 1

Into a 1.0 L vessel containing 200 ml of distilled water which was stirred with a prop-like stirrer at a rate of 2000 rpm was simultaneously added, 100.0 ml of a 1.0 M $MgCl_2$:$6H_2O$ solution at 10 ml per minute for 10 minutes; 100.0 ml of a 0.5 M $AlCl_3$:$6H_2O$ solution at 10 ml per minute for 10 minutes; and a 2.5 M NaOH solution at a rate sufficient to keep the pH of the reaction mixture between 8.5-9.0. The addition rate of 2.5 NaOH varied slightly between about 11 and 12 ml/min. After the addition was completed, the dispersion was then washed free of salt by dialfiltration, until the ionic conductivity of the dispersion was less than about 0.2 mS. The resulting dispersion had a mean particle size diameter of 134 nm with a standard deviation of 39 nm, and did not settle after standing three weeks indicating that the dispersion was a stable colloid. The percent solids of the final dispersion was 3.5% by weight. The particle size distribution parameters are given in Table 1. The particle size distribution curve is illustrated in FIG. 1 (squares).

Example 2

Into a 3.0 L vessel containing 400 ml of distilled water which was stirred with a prop-like stirrer at a rate of 2000 rpm was simultaneously added, 250.0 ml of a 2.0 M $MgCl_2$:$6H_2O$ solution at 25 ml per minute for 10 minutes; 250.0 ml of a 1.0 M $AlCl_3$:$6H_2O$ solution at 25 ml per minute for 10 minutes; and a 2.5 M NaOH solution at a rate sufficient to keep the pH of the reaction mixture between 8.5-9.0. The addition rate of 2.5 NaOH varied slightly between about 35 and 40 ml/min. After the addition was completed, the dispersion was then washed free of salt by dialfiltration, until the ionic conductivity of the dispersion was less than about 0.1 mS. The resulting dispersion had a mean particle size diameter of 19 nm with a standard deviation of 8 nm, and did not settle after standing one week indicating that the dispersion was a stable colloid. The 50 percentile average particle size was 19 nm (i.e., 50% of the particles are less than 19 nm in size) and 95% of the particles were less than 43 nm. The percent solids of the final dispersion was 3.8% by weight. The particle size distribution parameters are given in Table 1. The particle size distribution curve is illustrated in FIG. 1 (circles).

Example 3

Into a 3.0 L vessel containing 400 ml of distilled water which was stirred with a prop-like stirrer at a rate of 2000 rpm was simultaneously added, 650.0 ml of a 2.0 M $MgCl_2$:$6H_2O$ solution at 50 ml per minute for 13 minutes; 650.0 ml of a 1.0 M $AlCl_3$:$6H_2O$ solution at 50 ml per minute for 13 minutes; and a 5.0 M NaOH solution at a rate sufficient to keep the pH of the reaction mixture between 8.5-9.0. The addition rate of 5.0 NaOH varied slightly between about 50 and 55 ml/min. After the addition was completed, the dispersion was then washed free of salt by dialfiltration, until the ionic conductivity of the dispersion was less than about 0.1 mS. The resulting dispersion had a mean particle size diameter of 23 nm with a standard deviation of 10 nm, and did not settle after standing one week indicating that the dispersion was a stable colloid. The 50 percentile average particle size was 23 nm (i.e., 50% of the particles are less than 23 nm in size) and 95% of the particles were less than 55 nm. The percent solids of the final dispersion was 5.9% by weight. The particle size distribution parameters are given in Table 1.

Comparison Examples 4-6

Preparation of Larger Particle Size Anionic Clays

Anionic clays were also prepared using the same reactants as employed in Examples 1-3, but employing conventional layered double hydroxide precipitation techniques. The resulting particles were analyzed similarly as for Examples 1-3.

Comparison Example 4

(Carried out according to the procedure of Choy et al., *J. Am. Chem. Soc.* 121, 1399-1400 (1999)). Into a 250 mL vessel was added 0.100 L of a mixed solution which was 0.024 M in $Mg(NO_3)_2$ and 0.012 M in $Al(NO_3)_3$. To this solution, with vigorous stirring was added dropwise 34.6 ml of 0.25 N NaOH until the pH became 10.0. After the addition was complete the reaction mixture was stirred for about 10 minutes and then the stirring stopped and allowed to stand 1 hour. After 1 hour, the particles had settled to the bottom of the vessel indicating that the dispersion was not a stable colloid. The resulting dispersion had a mean particle size diameter of 1.58 microns with a standard deviation of 1.43 microns. The percent solids of the final dispersion was 0.25% by weight. The particle size distribution parameters are given in Table 1. The particle size distribution curve is illustrated in FIG. 1 (triangles).

Comparison Example 5

(Carried out according to the procedure of U.S. Pat. No. 6,329,515 B1 to Choy et al). Into a 500 mL vessel was added 0.100 L of a mixed solution which was 2.0 M in $Mg(NO_3)_2$ and 1.0 M in $Al(NO_3)_3$. To this solution, with vigorous stirring was added dropwise 242 ml of 2.5 N NaOH until the pH became 10.0. After the addition was complete the reaction mixture was stirred for about 10 minutes and then the stirring stopped and allowed to stand 1 hour. After 1 hour, the particles had settled to the bottom of the vessel indicating that the dispersion was not a stable colloid. The resulting dispersion had a mean particle size diameter of 0.73 microns with a standard deviation of 0.29 microns. The 50 percentile average particle size was 1.79 microns (i.e., 50% of the particles are less than 1.79 microns in size) and 95% of the particles were less than 2.3 microns. The percent solids of the final dispersion was 8.1% by weight. The particle size distribution parameters are given in Table 1.

Comparison Example 6

Coprecipitation Synthesis

Into a 250 mL vessel containing 20.0 ml of distilled water was added dropwise, 0.100 L of a mixed solution which was 0.024 M in $Mg(NO_3)_2$ and 0.012 M in $Al(NO_3)_3$, and simultaneously, 0.25 N NaOH at a rate sufficient to keep the pH near 10.0. After the addition was complete the reaction mixture was stirred for about 10 minutes and then the stirring stopped and allowed to stand 1 hour. After 1 hour, the particles had settled to the bottom of the vessel indicating that the dispersion was not a stable colloid. The resulting dispersion had a mean particle size diameter of 1.22 microns with a standard deviation of 1.64 microns. The percent solids of the final dispersion was 0.20% by weight. The particle size distribution parameters are given in Table 1.

TABLE 1

Particle size distribution parameters for examples and comparison examples.

| example or comparison example | mean (nm) | standard deviation (nm) | 10 percentile* (nm) | 50 percentile** (nm) | 90 percentile*** (nm) |
|---|---|---|---|---|---|
| Ex. 1 | 134 | 39 | 108 | 134 | 170 |
| Ex. 2 | 19 | 8 | 14 | 19 | 43 |
| Ex. 3 | 23 | 10 | 16 | 23 | 55 |
| Comp. Ex. 4 | 1580 | 1430 | 670 | 2450 | 5260 |
| Comp. Ex. 5 | 730 | 288 | 1420 | 1790 | 2290 |
| Comp. Ex. 6 | 1220 | 1640 | 540 | 1900 | 5590 |
| commercial hydrotalcite | 2680 | 1670 | 1490 | 3370 | 5910 |

*10 percent of the particles are smaller than the indicated value.
**50 percent of the particles are smaller than the indicated value.
***90 percent of the particles are smaller than the indicated value.

The invention has been described in detail with particular reference to certain preferred embodiments thereof, but it will be understood that variations and modifications can be effected within the spirit and scope of the invention.

The invention claimed is:

1. A composition of matter comprising anionic clay having the general formula $$[M^{2+}_{1-x}M^{3+}_x(OH)_2]^{x+}(x/n)A^{n-}\cdot yH_2O \quad (I)$$

where $M^{2+}$ is a divalent metal; and $M^{3+}$ is a trivalent metal; A is an inorganic or organic anion, chosen such that the rule of charge neutrality is obeyed; n is an integer; x is a rational number between 0.01 an 0.5; and y is any rational number between 0 and 10; where the anionic clay is in the form of particles having a volume weighted mean particle size diameter of less than 500 nm and where at least 90 volume percent of the particles of the anionic clay composition have a diameter smaller than 200 nm.

2. A composition according to claim 1, wherein $M^{2+}$ is a divalent metal selected from the group consisting of Ca, Mg, Mn, Co, Ni, Cu, Zn, and Cd; and $M^{3+}$ is a trivalent metal selected from the group consisting of Cr, Fe, Al, Ga, In, and Mo.

3. A composition according to claim 2, wherein $M^{2+}$ is selected from the group consisting of Ca, Mg and Zn and $M^{3+}$ is Al.

4. A composition according to claim 1, wherein A is selected from the group consisting of $OH^-$, $NO_3^-$, $F^-$, $Cl^-$, $Br^-$, $I^-$, $ClO_4^-$, $SO_4^{2-}$, and $CO_3^{2-}$.

5. A composition according to claim 4, wherein A is selected from $NO_3^-$ or $Cl^-$.

6. A composition according to claim 1, where the anionic clay particles have a mean, volume weighted, particle size diameter of less than 200 nm.

7. A composition according to claim 1, where the anionic clay particles have a mean, volume weighted, particle size diameter of less than 100 nm.

8. A composition according to claim 1, where at least 90 volume percent of the particles of the anionic clay composition have a diameter smaller than 500 nm.

9. A stable colloidal dispersion comprising anionic clay particles having a volume weighted mean particle size diameter of less than 500 nm dispersed in a liquid medium, where at least 90 volume percent of the dispersed particles of anionic clay have a diameter smaller than 200 nm, where the anionic clay particles comprise anionic clay having the general formula $$[M^{2+}_{1-x}M^{3+}_x(OH)_2]^{x+}(x/n)A^{n-}\cdot yH_2O \quad (I)$$

or $$[M^{1+}M^{3+}_2(OH)_6]^{1+}(1/n)A^{n-}\cdot yH_2O; \quad (II)$$

where $M^{1+}$ is a mono-valent metal; $M^{2+}$ is a divalent metal; and $M^{3+}$ is a trivalent metal; A is an inorganic or organic anion, chosen such that the rule of charge neutrality is obeyed; n is an integer; x is any rational number between 0 and 1; and y is any rational number between 0 and 10;

wherein the liquid medium comprises an aqueous medium, and wherein the weight percent of dispersed particles is greater than 5 weight %.

10. A colloidal dispersion according to claim 9, wherein A is selected from the group consisting of $OH^-$, $NO_3^-$, $F^-$, $Cl^-$, $Br^-$, $I^-$, $ClO_4^-$, $SO_4^{2-}$, and $CO_3^{2-}$.

11. A colloidal dispersion according to claim 10, wherein A is selected from $NO_3^-$ or $Cl^-$.

12. A colloidal dispersion according to claim 9, wherein the colloidal dispersion is stable in the absence of added surface modification reagents.

13. A colloidal dispersion according to claim 9, comprising a soluble salt concentration less than 0.1 moles/liter.

14. A colloidal dispersion according to claim 9, wherein $M^{1+}$ is a mono-valent metal selected from the group consisting of Li, Na, K, Rb, and Cs; $M^{2+}$ is a divalent metal selected from the group consisting of Ca, Mg, Mn, Co, Ni, Cu, Zn, and Cd; and $M^{3+}$ is a trivalent metal selected from the group consisting of Cr, Fe, Al, Ga, In, and Mo.

15. A colloidal dispersion according to claim 9, wherein the anionic clay is of the general formula (I), and wherein $M^{2+}$ is selected from the group consisting of Ca, Mg and Zn and $M^{3+}$ is Al.

16. A colloidal dispersion according to claim 9, wherein the anionic clay is of the general formula (I), and wherein x is a rational number between 0.01 an 0.5.

17. A colloidal dispersion according to claim 9, where the anionic clay particles have a mean, volume weighted, particle size diameter of less than 200 nm.

18. A colloidal dispersion according to claim 9, where the anionic clay particles have a mean, volume weighted, particle size diameter of less than 100 nm.

19. A colloidal dispersion according to claim 9, where at least 90 volume percent of the dispersed particles of anionic clay have a diameter smaller than 100 nm.

20. A method for preparing a stable colloidal dispersion of anionic clay particles having a volume weighted mean particle size diameter of less than 500 nm dispersed in a liquid medium, where at least 90 volume percent of the dispersed particles of anionic clay have a diameter smaller than 200 nm, where the anionic clay particles comprise anionic clay having the general formula $$[M^{2+}_{1-x}M^{3+}_x(OH)_2]^{x+}(x/n)A^{n-}\cdot yH_2O \quad (I)$$

or $$[M^{1+}M^{3+}_2(OH)_6]^{1+}(1/n)A^{n-}\cdot yH_2O; \quad (II)$$

where $M^{1+}$ is a mono-valent metal; $M^{2+}$ is a divalent metal; and $M^{3+}$ is a trivalent metal; A is an inorganic or organic anion, chosen such that the rule of charge neutrality is obeyed; n is an integer; x is any rational number between 0 and 1; and y is any rational number between 0 and 10;

comprising simultaneously bringing together salt solutions of $M^{2+}$ and $M^{3+}$ metals, or of $M^{1+}$ and $M^{3+}$ metals, and a base in a high shear mixing zone within a liquid dispersion medium in a particle precipitation vessel, and precipitating anionic clay particles having a volume weighted mean particle size diameter of less than 500 nm where at least 90 volume percent of the precipitated particles of anionic clay have a diameter smaller than 200 nm, wherein the high shear mixing zone in the particle precipitation vessel has a turnover rate of greater than 0.1 turnovers/sec.

21. A method according to claim 20, wherein the high shear mixing zone in the particle precipitation vessel has a turnover rate of greater than 0.5 turnovers/sec.

22. A method according to claim 20, wherein the metal salt solutions and base solution are contacted in the particle precipitation vessel by introducing feed streams of such components into a highly agitated zone of the particle precipitation vessel created by action of a rotary agitator, and wherein the feed streams and resulting precipitated anionic clay particles are dispersed in the vessel by action of the rotary agitator.

23. A method according to claim 20, further comprising washing the dispersion substantially free of soluble salt via diafiltration, ultrafiltration or nanofiltration.

24. A method according to claim 20, wherein the anionic clay comprises greater than 5% by weight of the colloid dispersion.

25. A method according to claim 20, where the precipitated anionic clay particles have a mean, volume weighted, particle size diameter of less than 200 nm.

26. A method according to claim 20, where the precipitated anionic clay particles have a mean, volume weighted, particle size diameter of less than 100 nm.

27. A method according to claim 20, where at least 90 volume percent of the precipitated particles of anionic clay have a diameter smaller than 100 nm.

* * * * *